US012125625B2

(12) United States Patent
Ebner et al.

(10) Patent No.: US 12,125,625 B2
(45) Date of Patent: Oct. 22, 2024

(54) METHOD OF ASSEMBLING A COMBINED TRANSFORMER/INDUCTOR DEVICE

(71) Applicant: VISHAY DALE ELECTRONICS, LLC, Columbus, NE (US)

(72) Inventors: Jason Ebner, Barrington, NH (US); Matthew Foley, Berwick, ME (US)

(73) Assignee: VISHAY DALE ELECTRONICS, LLC, Columbus, NE (US)

( * ) Notice: Subject to any disclaimer, the term of this patent is extended or adjusted under 35 U.S.C. 154(b) by 0 days.

(21) Appl. No.: 18/110,039

(22) Filed: Feb. 15, 2023

(65) Prior Publication Data

US 2023/0197330 A1 Jun. 22, 2023

Related U.S. Application Data

(62) Division of application No. 17/831,778, filed on Jun. 3, 2022, now Pat. No. 11,610,720, which is a division (Continued)

(51) Int. Cl.

*H01F 27/00* (2006.01)

*H01F 3/08* (2006.01)

(Continued)

(52) U.S. Cl.

CPC ............... *H01F 27/26* (2013.01); *H01F 3/08* (2013.01); *H01F 5/02* (2013.01); *H01F 17/043* (2013.01);

(Continued)

(58) Field of Classification Search

CPC ...... H01F 17/043; H01F 27/027; H01F 27/06; H01F 27/24; H01F 27/26; H01F 27/2823;

(Continued)

(56) References Cited

U.S. PATENT DOCUMENTS 4,853,668 A 8/1989 Bloom
4,916,424 A * 4/1990 Kijima .................. H01F 27/325 336/83

(Continued)

FOREIGN PATENT DOCUMENTS

JP 2003124037 A 4/2003
JP 2013115379 A 6/2013

(Continued)

OTHER PUBLICATIONS

European Patent Office "extended European search report" for corresponding European Patent Application No. 20840435.0, dated Nov 7, 2023, 8 pp.

(Continued)

*Primary Examiner* — Paul D Kim

(74) *Attorney, Agent, or Firm* — Eckert Seamans Cherin & Mellott, LLC

(57) ABSTRACT

A combined transformer/inductor device includes a core having a central core leg and an outer core leg spaced apart from the central core leg, an inner bobbin disposed around the central core leg, an outer bobbin disposed around the inner bobbin and the central core leg and having an upper portion having a first oblong portion disposed around the outer core leg, a lower portion having a second oblong portion disposed around the outer core leg, and a central portion disposed around the inner bobbin and the central core leg, a first winding wound around the inner bobbin, and a second winding wound around the outer bobbin, the second winding having a first portion wound around the first oblong portion, a second portion wound around the central portion, and a third portion wound around the second oblong portion.

14 Claims, 11 Drawing Sheets

Related U.S. Application Data of application No. 16/661,408, filed on Oct. 23, 2019, now Pat. No. 11,380,473.

(60) Provisional application No. 62/873,468, filed on Jul. 12, 2019.

(51) Int. Cl.

| | |
|---|---|
| ***H01F 5/02*** | (2006.01) |
| ***H01F 17/04*** | (2006.01) |
| ***H01F 27/02*** | (2006.01) |
| ***H01F 27/06*** | (2006.01) |
| ***H01F 27/24*** | (2006.01) |
| ***H01F 27/26*** | (2006.01) |
| ***H01F 27/28*** | (2006.01) |
| ***H01F 27/29*** | (2006.01) |
| *H01F 27/32* | (2006.01) |

(52) U.S. Cl.

CPC ........... *H01F 27/027* (2013.01); *H01F 27/06* (2013.01); *H01F 27/24* (2013.01); *H01F 27/2823* (2013.01); *H01F 27/29* (2013.01); *H01F 2005/022* (2013.01); *H01F 27/325* (2013.01)

(58) Field of Classification Search

CPC .......... H01F 27/29; H01F 27/325; H01F 3/08; H01F 5/02; H01F 2005/022

See application file for complete search history.

(56) References Cited

U.S. PATENT DOCUMENTS

| | | | | | |
|---|---|---|---|---|---|
| 5,673,013 | A * | 9/1997 | Moody | H01F 5/02 | 336/208 |
| 6,449,178 | B1 * | 9/2002 | Sakai | H01F 29/14 | 363/131 |
| 8,284,009 | B2 * | 10/2012 | Akiyama | H01F 27/326 | 336/219 |
| 11,562,844 | B2 | 1/2023 | Kang et al. | | |
| 2007/0246594 | A1 * | 10/2007 | Pan | H01F 21/04 | 242/474.4 |
| 2014/0008974 | A1 | 1/2014 | Miyamoto | | |

FOREIGN PATENT DOCUMENTS

| | | | |
|---|---|---|---|
| JP | 2015065404 | A | 4/2015 |
| JP | 2021525955 | A | 9/2021 |
| KR | 101762559 | B1 | 7/2017 |
| TW | 201729226 | A | 8/2017 |

OTHER PUBLICATIONS

Taiwan Patent Office "Office Action with search report (search report translated in English)" for corresponding Taiwanese Patent Application No. 109122545, dated Nov. 24, 2023, 6 pp.

Japanese Patent Office "Notice of Reasons for Refusal" (with English translation) for corresponding Japanese Patent Application No. 2022-501170, dated Apr. 30, 2024, 10 pp.

* cited by examiner

METHOD OF ASSEMBLING A COMBINED TRANSFORMER/INDUCTOR DEVICE

CROSS REFERENCE TO RELATED APPLICATIONS

This application is a divisional application of and claims priority to U.S. patent application Ser. No. 17/831,778, filed Jun. 3, 2022, which is a divisional application of and claims priority to U.S. patent application Ser. No. 16/661,408, filed Oct. 23, 2019, now U.S. Pat. No. 11,380,473, issued Jul. 5, 2022, entitled TRANSFORMER INDUCTOR COMBINATION DEVICE, which claims priority from U.S. Provisional Patent Application Ser. No. 62/873,468, filed Jul. 12, 2019, entitled "TRANSFORMER INDUCTOR COMBINATION DEVICE", the contents of each of which are incorporated herein by reference.

FIELD OF THE INVENTION

The disclosed concept relates generally to electrical components, and more particularly, to magnetic devices such as inductors and transformers.

BACKGROUND OF THE INVENTION

Resonant converters are used in a variety of applications such as power conversion. For example, resonant converters are commonly used in automotive charging applications. Resonant converters are also employed in a variety of other industries such as alternate energy, military, and industrial applications.

Resonant converters typically include a transformer winding electrically coupled to a resonant tank circuit including an inductor. Some applications call for a larger resonant inductance.

In commercial applications, the transformer and the inductor of the resonant tank circuit are individual devices, which allows easy selection of electrical properties for the transformer and the inductor. However, the separate device result in a larger footprint than a combined device. Additionally, the separate devices do not share any components or manufacturing steps. A combined transformer/inductor device could result in a reduced footprint and manufacturing cost. However, it is challenging to create a combined transformer/inductor device that retains suitable electrical properties and is easy to manufacture.

There is room for improvement in combined transformer/inductor devices.

SUMMARY OF THE INVENTION

In accordance with an aspect of the disclosed concept, a combined transformer/inductor device comprises: a core having a central core leg and an outer core leg spaced apart from the central core leg; an inner bobbin disposed around the central core leg; an outer bobbin disposed around the inner bobbin and the central core leg and having an upper portion having a first oblong portion disposed around the outer core leg, a lower portion having a second oblong portion disposed around the outer core leg, and a central portion disposed around the inner bobbin and the central core leg; a first winding wound around the inner bobbin; and a second winding wound around the outer bobbin, the second winding having a first portion wound around the first oblong portion, a second portion wound around the central portion, and a third portion wound around the second oblong portion.

In accordance with an aspect of the disclosed concept, a core comprises: a central core leg; and an outer core leg spaced apart from the central core leg, wherein the outer core leg has a radiused outer surface.

In accordance with an aspect of the disclosed concept, a bobbin comprises: an inner portion having a first opening formed therein; an upper portion having a first oblong portion extending from the inner portion and having an upper opening formed therein; a lower portion having a second oblong portion extending from the inner portion and having a lower opening formed therein, wherein the upper portion extends less than or equal to half a height of the bobbin and the lower portion extends less than or equal to half the height of the bobbin.

In accordance with an aspect of the disclosed concept, a method of assembling a combined transformer/inductor device comprises: winding an inner bobbin; winding an outer bobbin, wherein winding the outer bobbin comprises: winding a first portion of the outer bobbin around an inner portion and a first oblong portion of the outer bobbin; and winding a central portion of the outer bobbin around the inner portion of the outer bobbin; sliding the inner bobbin into the outer bobbin; sliding the inner and outer bobbins onto central and outer core legs of a core; and joining upper and lower portions of the core.

BRIEF DESCRIPTION OF THE DRAWINGS

A full understanding of the invention can be gained from the following description of the preferred embodiments when read in conjunction with the accompanying drawings in which:

FIG. 4 is;

DETAILED DESCRIPTION OF THE INVENTION

Figure 1:
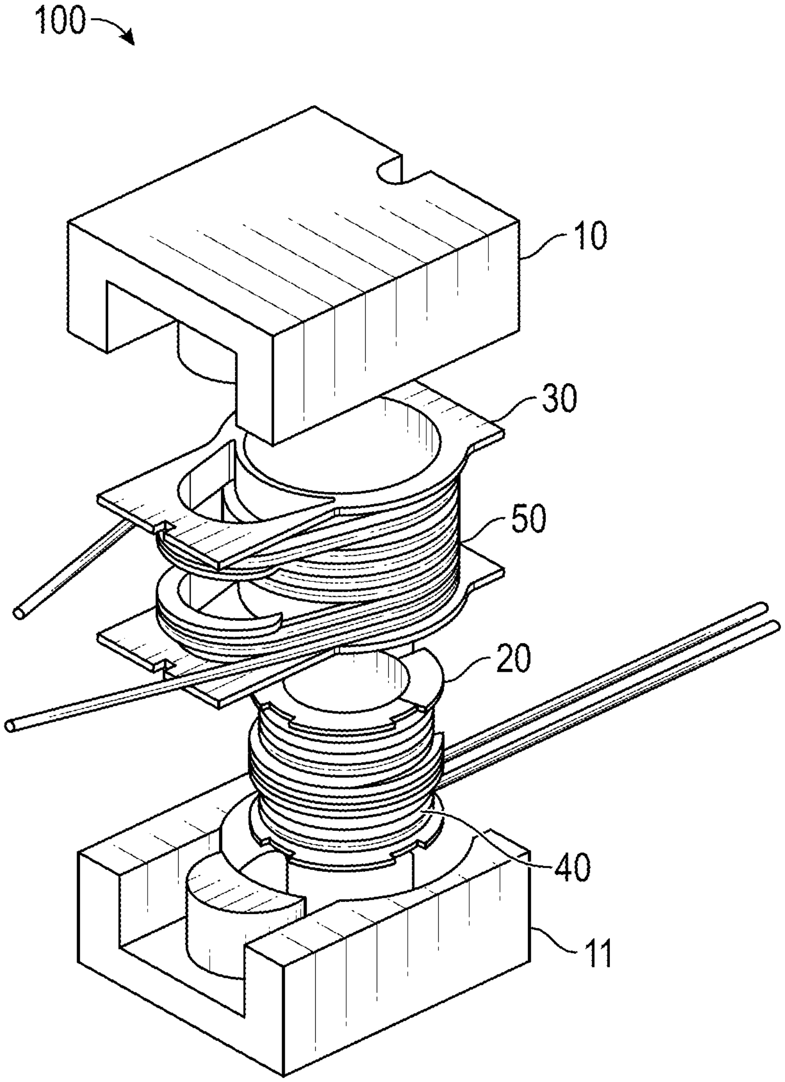
FIG. 1 is an exploded view of a combined inductor/transformer device in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

Figure 2A:
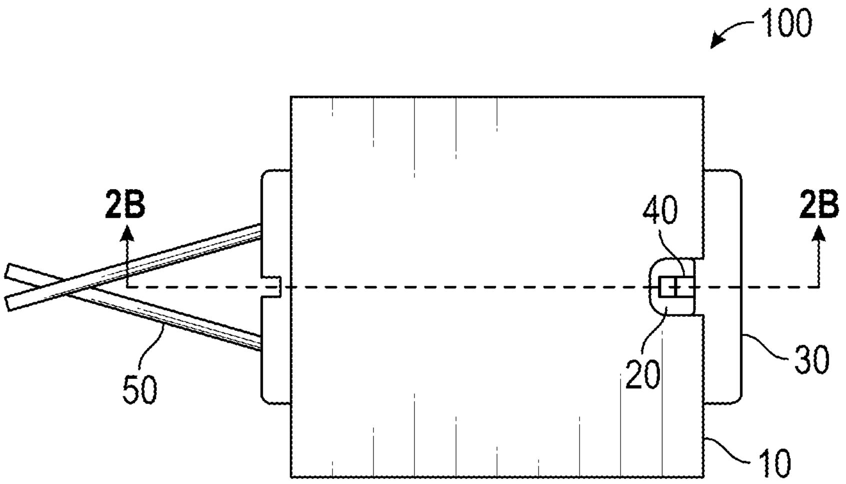
FIG. 2A is a top view of a combined inductor/transformer device in accordance with an example embodiment of the disclosed concept.
Figure 2B:
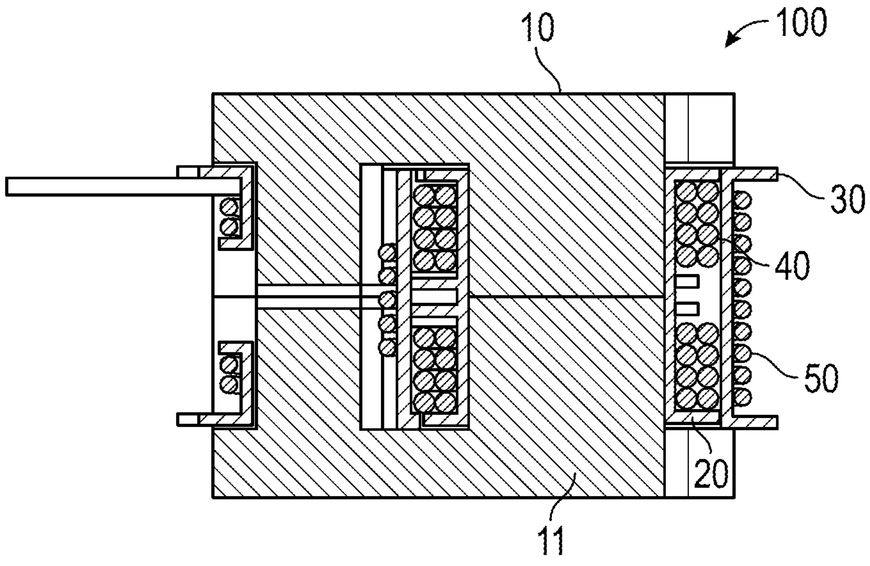
FIG. 2B is a side section view of the inductor transformer device of FIG. 2A.

FIG. 1 is an exploded assembly view of a combined transformer/inductor device 100 in accordance with an exemplary embodiment of the disclosed concept. FIG. 2A is a top view of the assembled combined transformer/inductor device 100 and FIG. 2B is a section view of the assembled combined transformer/inductor device 100.

The combined transformer/inductor device 100 includes a core 10,11, an inner bobbin 20, and an outer bobbin 30. The inner bobbin 20 is wound with a first winding 40 and the outer bobbin 30 is wound with a second winding 50. The first winding 40 forms one winding of a transformer and the second winding 50 forms a second winding of the transformer and the winding of an inductor. As a result, the combined transformer/inductor device 100 includes a transformer and an inductor.

The core 10,11 is formed from an upper core 10 and a lower core 11. The upper core 10 and the lower core 11 may have similar shapes. However, it will be appreciated that the upper core 10 and the lower core 11 may have different shapes without departing from the scope of the disclosed concept. In some example embodiments, the core 10,11 may be based on a PQ core. However, the core 10,11 may be based on other types of cores without departing from the scope of the disclosed concept. In some example embodiments, the core 10,11 may be composed of ferrite, but other suitable materials may be employed without departing from the scope of the disclosed concept.

Figure 3A:
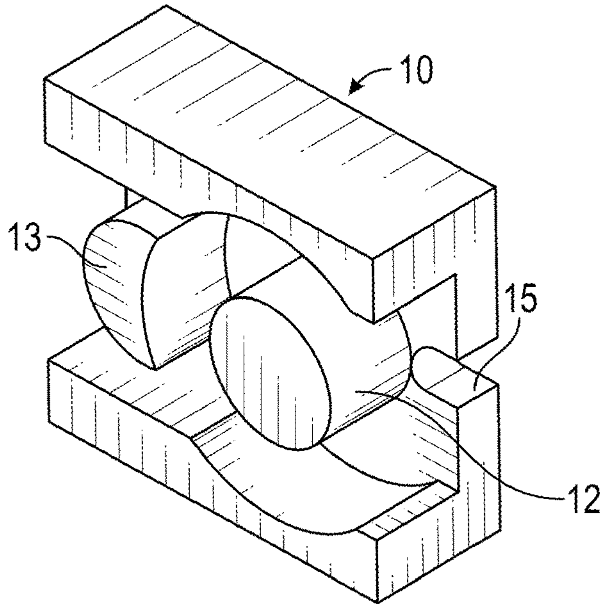
FIG. 3A is an isometric view of an upper or lower core in accordance with an example embodiment of the disclosed concept.
Figure 3B:
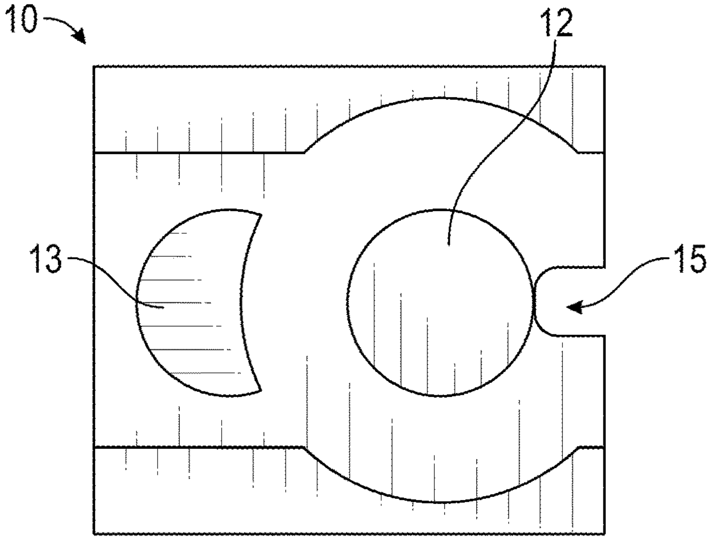
FIG. 3B is a bottom view of the upper or lower core of FIG. 3A.
Figure 3C:
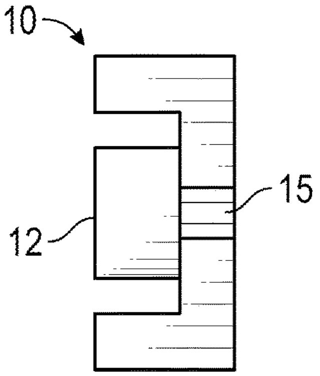
FIG. 3C is a side view of the upper or lower core of FIG. 3A.

FIG. 3A is an isometric view of the upper core 10, FIG. 3B is a bottom view of the upper core 10, and FIG. 3C is a side view of the upper core 10. As noted above, the lower core 11 may have the same or a similar shape as the upper core 10 and, thus, the illustrations in FIGS. 3A-C may alternatively represent the lower core 11. The upper core 10 includes a central core leg 12 and an outer core leg 13. The central core leg 12 and the outer core leg 13 are spaced apart from each other. The central core leg 12 has a cylindrical shape (but may have other shapes without departing from the scope of the disclosed concept) and the outer core leg 13 has a radiused outer surface (for example and without limitation, a half-moon or crescent shape as shown in the non-limiting example embodiment of FIG. 3A). It will be appreciated that the outer core leg 13 with a radiused outer surface is just one example of an outer core leg 13. The outer core leg 13 may have other shapes, such as shapes without a radiused outer surface, without departing from the scope of the disclosed concept. The central core leg 12 extends such that it aligns with the corresponding central core leg 12 of the lower core 11. The outer core leg 13 in some example embodiments is shorter than the central core leg 12. In some example embodiment, there may be a gap between the outer core leg 13 of the upper core 10 and the outer core leg 13 of the lower core 11 when the core 10,11 is assembled. For example, FIG. 2B illustrates the air gap between the outer core legs 13. However, it will be appreciated that in example embodiment of the disclosed concept, there may be an air gap between the outer core legs 13, an air gap between the central core legs 12, both, or neither without departing from the scope of the disclosed concept.

The cylindrical shape of the central core leg 12 reduces the mean length of a turn. The outer core leg 13 is positioned away from the central core leg 12 such that portion of the second winding 50 that extends around the outer core leg 13 in an oblong configuration with no externally needed jogs in the wire used in the second winding 50 so that the wire can remain smooth.

The inner bobbin 20 is structured to surround the central core leg 12. The outer bobbin 30 is structured to surround the central core leg 12, but also to extend around the outer core legs 13, as is shown in FIG. 2B, for example. The inner bobbin 20 has a smaller diameter than the outer bobbin 30 such that the inner bobbin 20 is nested inside the outer bobbin 30 when the combined transformer/inductor device 100 is assembled.

Figure 4A:
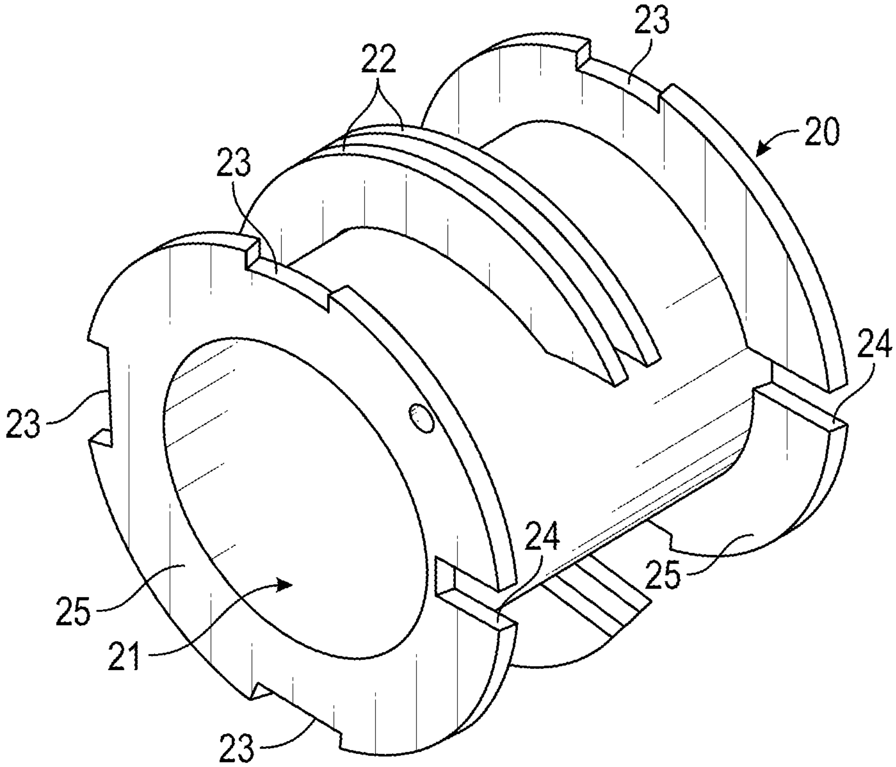
FIG. 4A is an isometric view of an inner bobbin in accordance with an example embodiment of the disclosed concept.
Figure 4B:
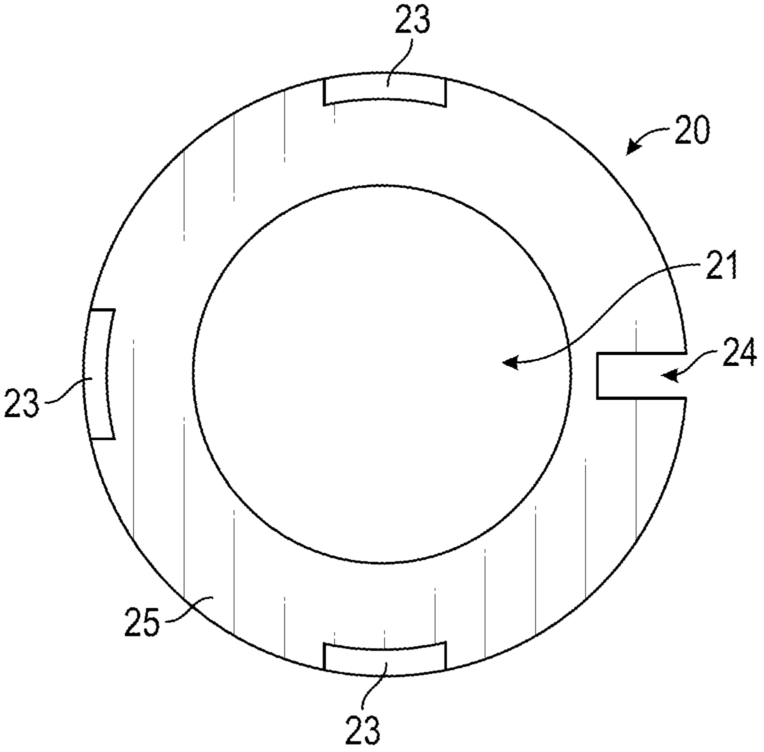
FIG. 4B is a top view of the inner bobbin of FIG. 4A.
Figure 4C:
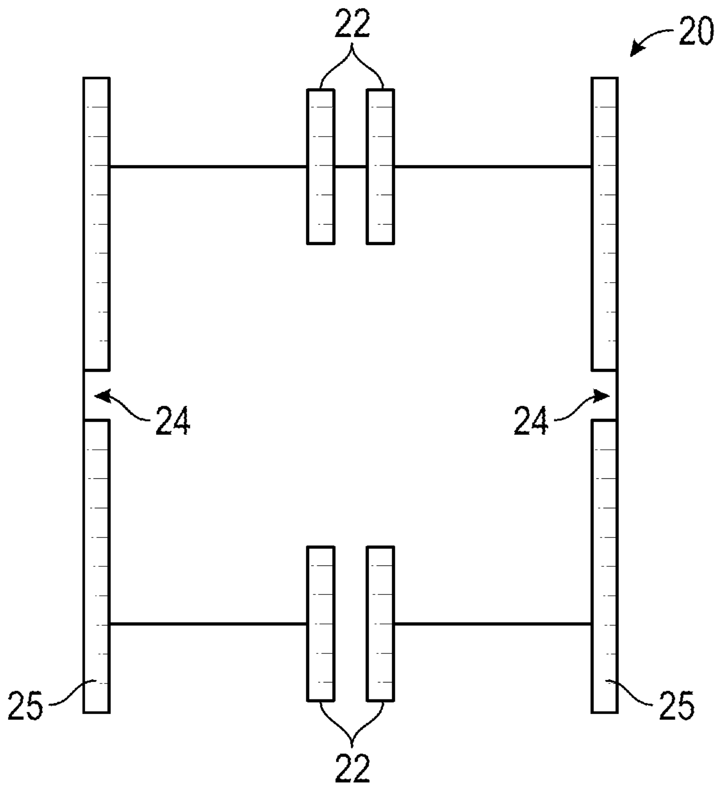
FIG. 4C is a side view of the inner bobbin of FIG. 4A.
Figure 4D:
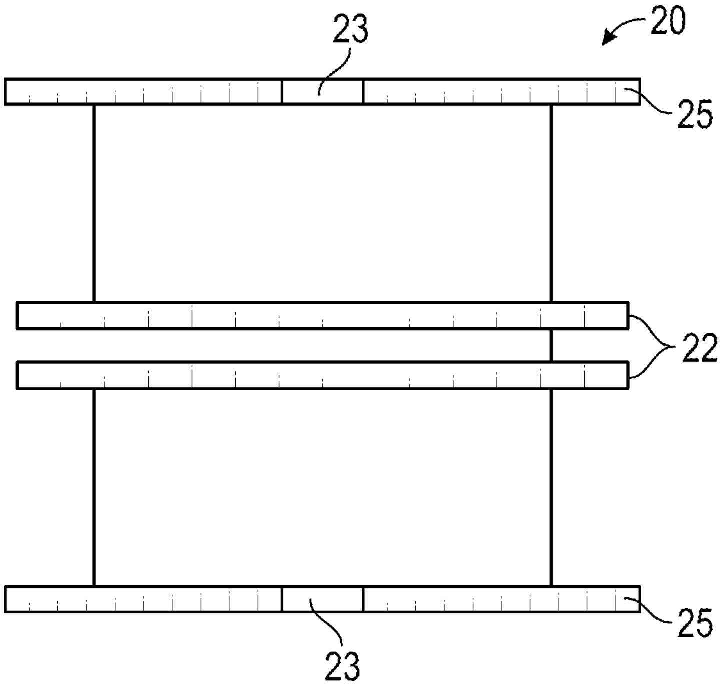
FIG. 4D is another side view of the inner bobbin of FIG. 4A.

FIG. 4A is an isometric view of the inner bobbin 20 in accordance with an example embodiment of the disclosed concept. FIG. 4B is a top view of the inner bobbin 20, FIG. 4C is a side view of the inner bobbin 20, and FIG. 4D is another side view of the inner bobbin 20. In some example embodiments, the inner bobbin 20 may be composed of plastic material, which isolates the first winding 40 from the core 10,11 and eliminates the need to use jacketed wire. The inner bobbin 20 has a substantially cylindrical shape (but may have other shapes without departing from the scope of the disclosed concept) with a central hollow opening 21. The central hollow opening 21 has a diameter slightly larger than the diameter of the central core leg 12 such that the inner bobbin 20 can slide onto the central core leg 12.

The inner bobbin 20 includes flanges 25 located at each of its ends. The flanges 25 isolate the first winding 40 from the core 10,11. Notches 24 are formed in the flanges 25 that allow egress of the wire used in the first winding 40. For example, the wire may pass through one of the notches 24 and subsequently pass through the corresponding notch 15 formed in the core 10,11 where it can subsequently be connected to external circuitry.

In some example embodiments, the inner bobbin 20 also includes ridges 22 formed in a central portion of the inner bobbin 20. The ridges 22 space the first winding 40 away from the central part of the central core leg 12. In some example embodiments, the central core leg 12 has an air gap and the ridges 22 may be used to space the first winding 40 away from the air gap so that eddy currents from fringing flux may be minimized. The ridges may extend around only a portion of the circumference of the inner bobbin 20 or, in some example embodiments, may extend around the entire circumference of the inner bobbin 20. For example, the ridges 22 may not extend in the area of the notches 24, thus allowing a path for the wire of the first winding 40 to egress through the notches 24. It will be appreciated, though, that the ridges 22 may be omitted without departing from the scope of the disclosed concept. For example, in some example embodiments where the central core leg 12 does not have an air gap, the ridges 22 may be omitted.

The flanges 25 of the inner bobbin 20 may further include locking notches 23. The locking notches 23 may correspond to posts 60 (shown in FIG. 6) of the outer bobbin 30. For example, the locking notches 23 may fit into the posts 60 of the outer bobbin 30 to lock the inner bobbin 20 into place so that it does not rotate with respect to the outer bobbin 30, thus eliminating a need for glue or other adhesives. However, it will be appreciated that glue or other adhesives may still be employed without departing from the scope of the disclosed concept. In some example embodiments, the notches 24 are elongated in a direction toward the center of the inner bobbin 20 while the locking notches 23 are elongated in a direction along a circumference of the flanges 25. It will be appreciated, though, that the shapes of the notches 24 and locking notches 23 may be modified without departing from the scope of the disclosed concept. The locking notches 23 are female features, meaning that they receive a corresponding male feature, such as the posts 60. However, the locking notches 23 may be replaced with male features, such as posts, and the posts 60 may be replaced with female features, such as notches, without departing from the scope of the disclosed concept.

Figure 5A:
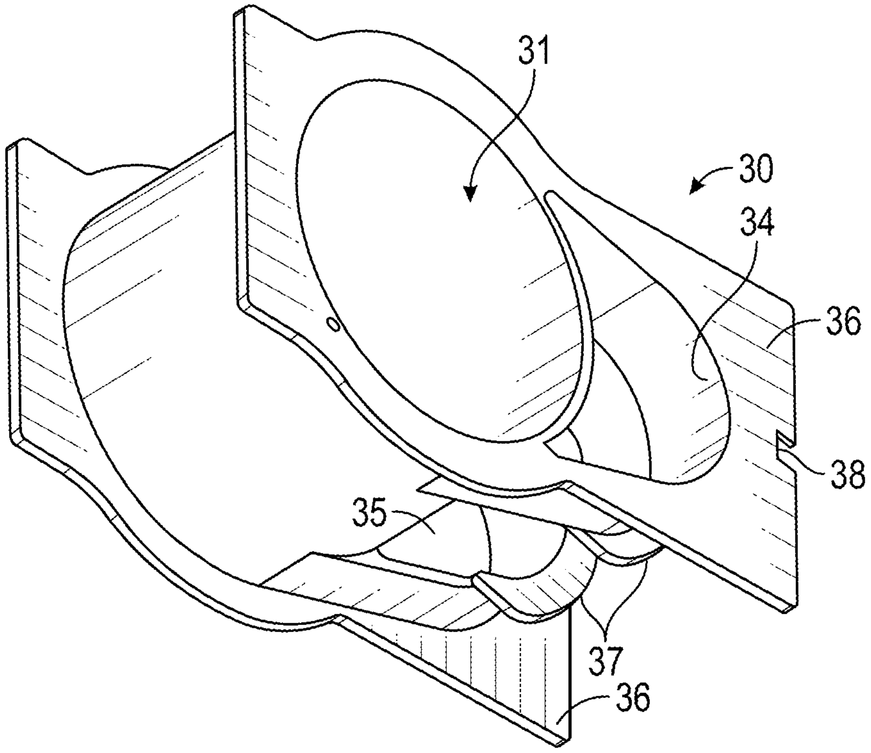
FIG. 5A is an isometric view of an outer bobbin in accordance with an example embodiment of the disclosed concept.
Figure 5B:
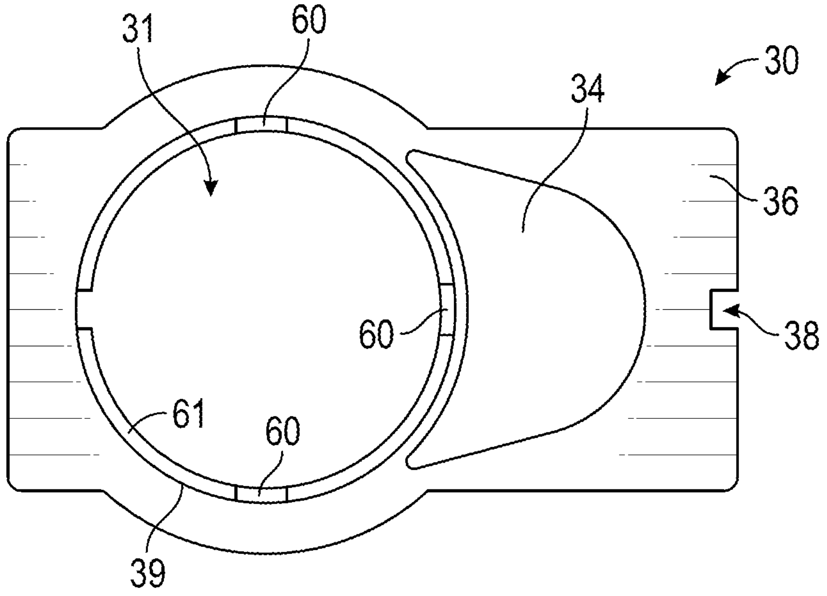
FIG. 5B is a top view of the outer bobbin of FIG. 5A.
Figure 5C:
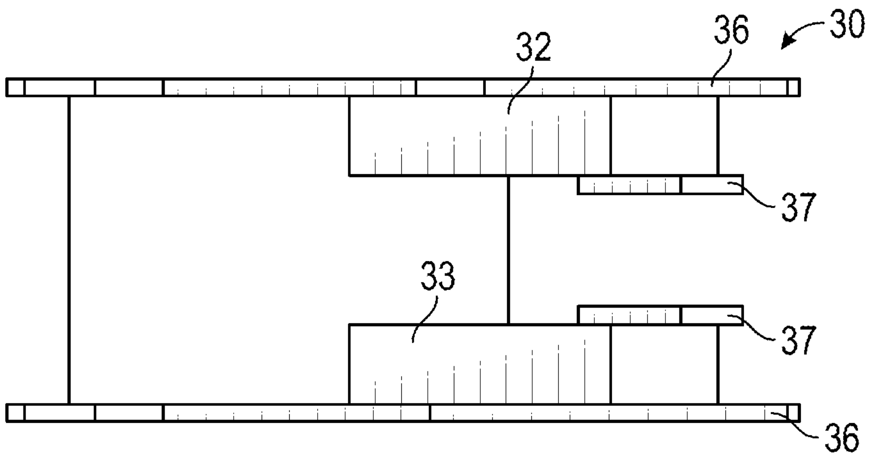
FIG. 5C is a side view of the outer bobbin of FIG. 5A.
Figure 5D:
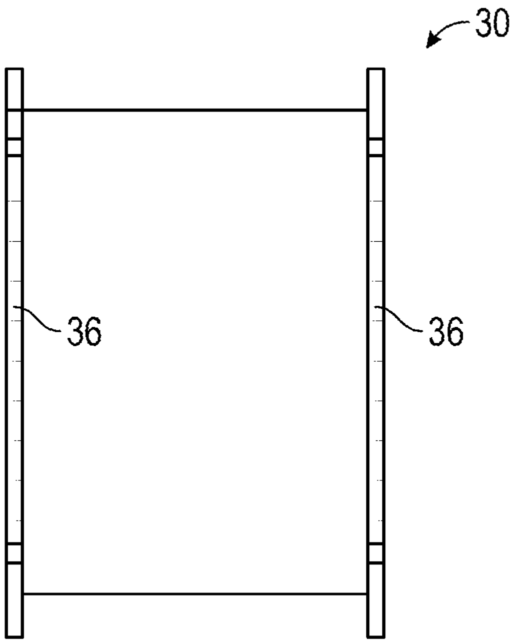
FIG. 5D is a rear view of the outer bobbin of FIG. 5A.

FIG. 5A is an isometric view of the outer bobbin 30 in accordance with an example embodiment of the disclosed concept. FIG. 5B is a top view of the outer bobbin 30, FIG. 5C is a side view of the outer bobbin 30, and FIG. 5D is a rear view of the outer bobbin 30. The outer bobbin 30, like the inner bobbin 20, may be composed of a plastic material that isolates the second winding 50 from the core 10,11 as well as from the first winding 40. The outer bobbin 30 has a three part shape including an upper portion, a lower portion, and a central portion. The outer bobbin 30 includes a cylindrically shaped central hollow opening 31 (but may have other shapes without departing from the scope of the disclosed concept) that is common to the upper, lower, and central portions of the outer bobbin 30. The diameter of the central hollow opening 31 is slightly larger than the diameter of the flanges 25 of the inner bobbin 20 such that the inner bobbin 20 can be nested within the outer bobbin 30. The outer bobbin 30 also includes flanges 36 formed at is ends which isolate the second winding 50 from the core 10,11 and winding 40. While jacketed wire may be used for windings 40 or 50, the outer bobbin 30 between the inner winding and the outer winding 50 eliminates the need to use jacketed wire for voltage isolation.

The upper portion of the outer bobbin 30 has an oblong shape. The upper portion includes an oblong portion 32 that corresponds to the shape of the outer core leg 13. The oblong portion 32 extends away from the central hollow opening 31 of the outer bobbin 30. An outer hollow opening 34 is formed in the oblong portion 32. The outer hollow opening 34 has a shape that corresponds to the shape of the outer core leg 13. In some example embodiments, the outer core leg 13 and the outer hollow opening 34 both have half-moon shapes. The outer hollow opening 34 is slightly larger than the outer core leg 13 such that the outer hollow opening 34 can slide over the outer core leg 13. The oblong portion 32 is bounded by flanges 36,37 on its upper and lower ends, which isolate the second winding 50 from core 10,11 and space the second winding 50 away from the air gap in the outer core leg 13 so that eddy currents from fringing flux may be minimized. The height of the oblong portion 32 is less than or equal to the height of the upper part of the outer core leg 13, as is shown for example in FIG. 2B, such that the second winding 50 is restricted from extending over the air gap in the outer core leg 13.

The lower portion of the outer bobbin 30 is substantially similar to the upper portion of the outer bobbin 30. For example, the lower portion of the outer bobbin 30 includes an oblong portion 33 and an outer hollow opening 35 that are substantially similar in shape to the oblong portion 32 and the outer hollow opening 34 in the upper portion of the outer bobbin 30.

The central portion of the outer bobbin 30, located between the upper and lower portions of the outer bobbin 30, does not include oblong portions. Rather, the central portion only includes the cylindrical portion of the outer bobbin 30 including the central hollow opening 31.

The second winding 50 may be composed from a single continuous piece of wire. For example, the second winding 50 may be formed by winding the piece of wire around both the cylindrical portion and the oblong portion 32 of the upper portion of the outer bobbin 30 by a number of turns. The second winding 50 continues with winding the piece of wire around just the cylindrical portion of the outer bobbin in the central portion of the outer bobbin 30 by a number of turns. Next, the second winding 50 continues with winding the piece of wire around both the cylindrical portion and the oblong portion 33 of the lower portion of the outer bobbin 30 by a number of turns to complete the turns needed for both the transformer winding and the inductor winding. It will be appreciated, though, that the order of winding may be reversed by beginning with winding around the lower portion of the outer bobbin 30 and ending with winding around the upper portion of the outer bobbin 30 without departing from the scope of the disclosed concept. The second winding 50 forms one winding of the transformer and the winding of the inductor. For example the winding around the upper and lower portions of the outer bobbin 30 forms the winding of the inductor and the winding around the upper, lower, and central portions of the outer bobbin 30 forms one winding of the transformer. The first winding 40 around the inner bobbin 20 forms another winding of the transformer. Thus, with the first and second windings 40,50, the combined transformer/inductor device 100 provides the functionality of both a transformer and an inductor. By winding in an oblong shape around the outer core leg 13, a larger resonant inductance is provided, which is useful in resonant converter applications. In some example embodiments, the second winding 50 may only be wound around the central portion of the outer bobbin 30 and only one of the upper and lower portions of the outer bobbin 30. In applications where a larger resonant inductance is not needed, winding the second winding 50 around the central portion of the outer bobbin 30 and only one of the upper and lower portions of the outer bobbin 30 may provide sufficient resonant inductance.

The outer bobbin 30 may further include one or more notches 38. The one or more notches 38 may be formed in the flanges 36 and allow for egress of the wire that forms the second winding 50.

Figure 6:
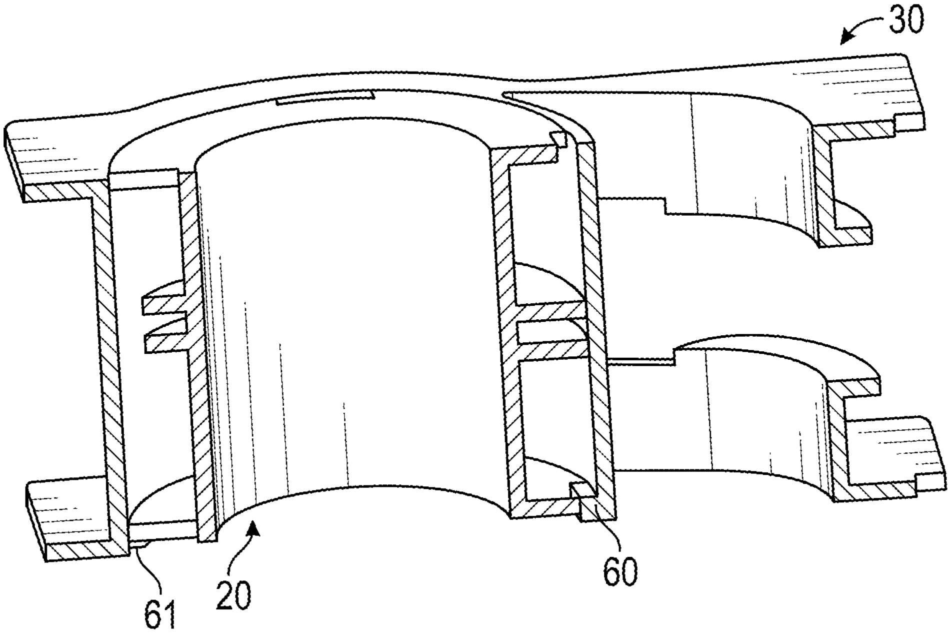
FIG. 6 is a section view of an inner bobbin nested within an outer bobbin in accordance with an example embodiment of the disclosed concept.

FIG. 6 is a section view of the inner bobbin 20 nested within the outer bobbin 30. As shown in FIG. 6, the outer bobbin 30 may further include one or more protrusions 61 that extend into the central hollow opening 31 of the outer bobbin 30. The one or more protrusions may serve as vertical movement stops that stop the vertical movement of the inner bobbin 20 when it is nested within the outer bobbin

30. For example, when the inner bobbin 20 is inserted into the outer bobbin 30 from above the outer bobbin 30, the inner bobbin 20 will slide into the outer bobbin 30 until the flange 25 of the inner bobbin 20 abuts against the one or more protrusions 61 and is stopped from further vertical movement through the outer bobbin 30, thus aligning the inner bobbin 20 with the outer bobbin 30 vertically and preventing the inner bobbin 20 to slide out of the outer bobbin 30.

Figure 7:
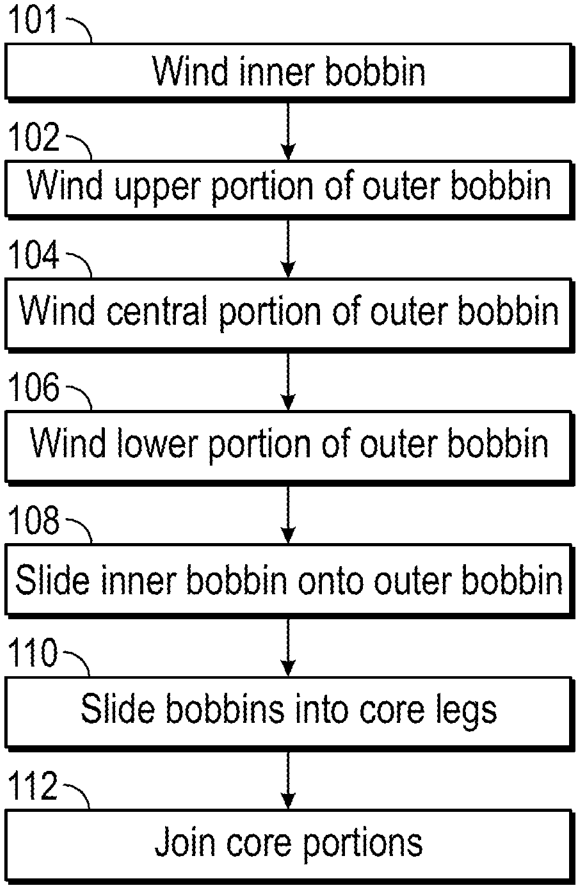
FIG. 7 is a flowchart of a method of assembling a combined transformer/inductor device in accordance with an example embodiment of the disclosed concept.

FIG. 7 is a flowchart of a method of assembling a combined transformer/inductor device in accordance with an example embodiment of the disclosed concept. The method of FIG. 7 may be used to assemble the combined transformer/inductor device 100 shown in FIGS. 2A and 2B, for example. The method will be described with respect to the example embodiments disclosed herein, but it will be appreciated that the method may be applied to other variations of combined transformer/inductor devices not explicitly disclosed herein without departing from the scope of the disclosed concept.

The method begins at 101 where the inner bobbin 20 is wound. The method continues at 102 where the upper portion of the outer bobbin 30 is wound. The method continues at 104 where the central portion of the outer bobbin 30 is wound and continues on to 106 where in the lower portion of the outer bobbin 30 is wound. As described herein, winding around the upper and lower portions includes winding around the oblong portions 32,33, respectively, as well as around the cylindrical portion, while winding around the central portion includes only winding around the cylindrical portion. It will also be appreciated that steps 102-106 may be performed in any order and/or one or more of these steps may be performed simultaneously with one or more of other of these steps without departing from the scope of the disclosed concept. It will also be appreciated that in some example embodiments, steps 102 or 106 may be omitted without departing from the scope of the disclosed concept. For example, in applications where a larger resonant inductance is not needed, winding around only one of the upper or lower portions of the outer bobbin 30 may provide sufficient inductance. Additionally, the inner bobbin 20 may be nested inside of the outer bobbin 30 after the first winding 40 has been completed and prior to the second winding 50 being wound around the outer bobbin 30.

The method continues to 108, where the inner bobbin 20 is slid into the outer bobbin 108. As described herein, locking features, such as the locking notches 23 and posts 60 may be used to align and lock the inner bobbin 20 into place with respect to the outer bobbin 30. Once the inner bobbin 20 has been slid into the outer bobbin 30, the method continues to 110 where joined inner and outer bobbins 20,30 are slid onto the central and outer core legs 12,13 of the core 10,11. The method then continues to 112 where the upper and lower core portions 10,11 are joined to form the core 10,11 with the wound inner and outer bobbins 20,30 disposed within the core 10,11 around the central and outer core legs 12,13. The result in the combined transformer/inductor device 100 shown in FIGS. 2A and 2B.

It will be appreciated that the order of the steps of the method may be changed without departing from the scope of the disclosed concept. It will also be appreciated that additional steps may be employed in the method such as, for example and without limitation, egressing the wires, without departing from the scope of the disclosed concept.

Although the example embodiments have been described with respect to a single winding on the inner bobbin 20 and a single winding wound around the outer bobbin 30, it will be appreciated that multiple windings may be wound around the inner and/or outer bobbins 20,30 without departing from the scope of the disclosed concept. It will also be appreciated that the first and second windings 40,50, or other windings that are wound around the inner and/or outer bobbins 20,30 may be tapped at multiple points without departing from the scope of the disclosed concept.

Figure 8A:
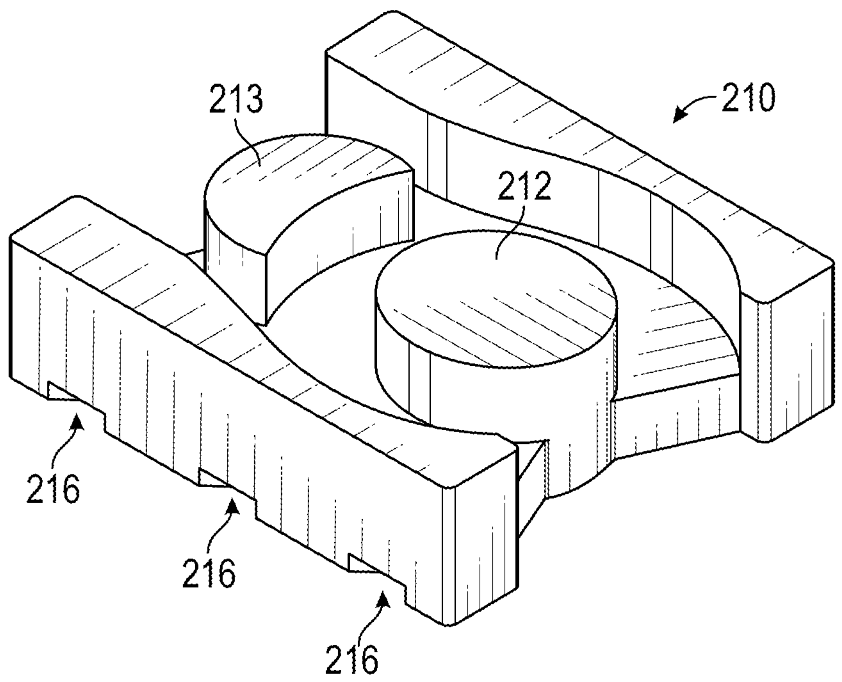
FIG. 8A is an isometric view of an upper or lower core in accordance with an example embodiment of the disclosed concept.
Figure 8B:
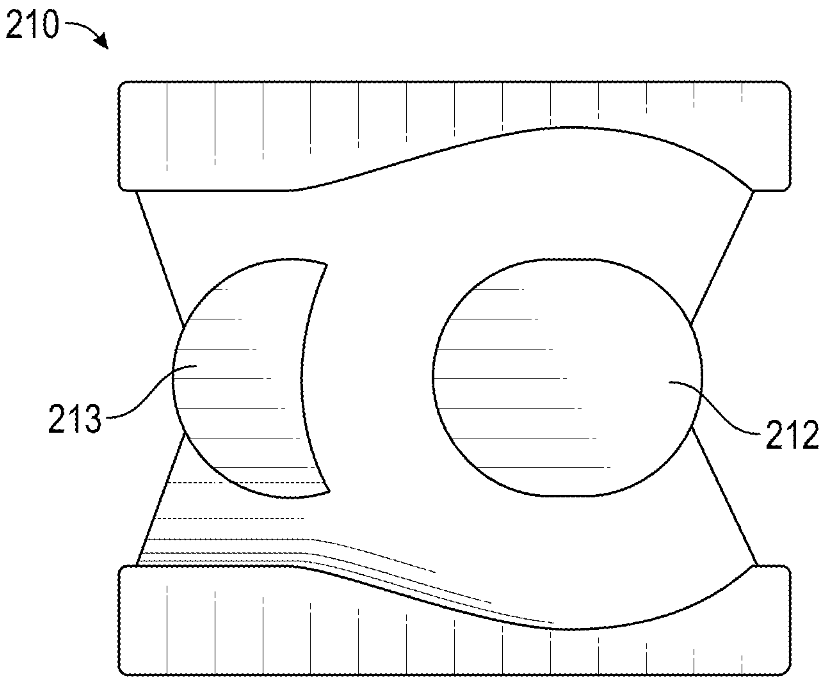
FIG. 8B is a top view of the upper or lower core of FIG. 8A.

FIG. 8A is an isometric view of an upper core 210 in accordance with an example embodiment of the disclosed concept and FIG. 8B is a top view of the upper core 210. It will be appreciated that the upper core 210 may also be a lower core without departing from the scope of the disclosed concept. It will also be appreciated that the upper core 210 may be coupled with a lower core, the same or similar to the upper core 210, like the upper and lower cores 10,11 are coupled as shown in FIG. 2B, for example, to form a core.

The upper core 210 includes a central core leg 212 and an outer core leg 213. The central core leg 212 and the outer core leg 213 are spaced apart from each other. The central core leg 212 has oblong shape and the outer core leg 213 has a radiused outer surface (for example and without limitation, a half-moon shape as shown in the non-limiting example embodiment of FIG. 8A). When the upper core 210 is coupled with a lower core, there may be an air gap between the outer core leg 213 of the upper core 210 and the corresponding outer core leg 213 of the lower core. Similarly, there may be an air gap between the central core leg 212 of the upper core 210 and the corresponding central core leg of the lower core.

The upper core 210 is somewhat similar to the upper core 10 described above with respect to FIGS. 3A-C. However, the central core leg 212 of the upper core 210 has an oblong shape rather than a cylindrical shape. Additionally, in some example embodiments, the upper core 210 may have a smaller height than the upper core 10. The upper core 210 also includes angled surfaces extending from edges of the upper core 210 to the central core leg 212 and outer core leg 213, respectively. The angled surfaces create openings allowing easy egress of wires from windings around the central core leg 212 and outer core leg 213. Additionally, the upper core 210 includes recesses 216 formed along its outer edges (the recesses 216 formed along the far outer edge are hidden from view in FIG. 8A). The recesses 216 may be suitable for receiving attachment mechanisms (e.g., without limitation, clips, straps, etc.) to join the upper core 210 with a corresponding lower core.

It will be appreciated that the upper core 210 may be modified to include features of the upper or lower core 10,11 without departing from the scope of the disclosed concept, and, similarly, the upper or lower core 10,11 may be modified to include features of the upper core 210 without departing from the scope of the disclosed concept.

Figure 9A:
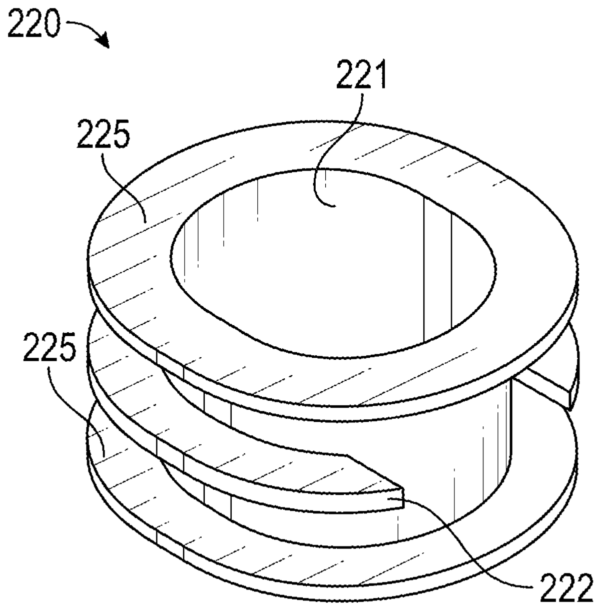
FIG. 9A is an isometric view of an inner bobbin in accordance with an example embodiment of the disclosed concept.
Figure 9B:
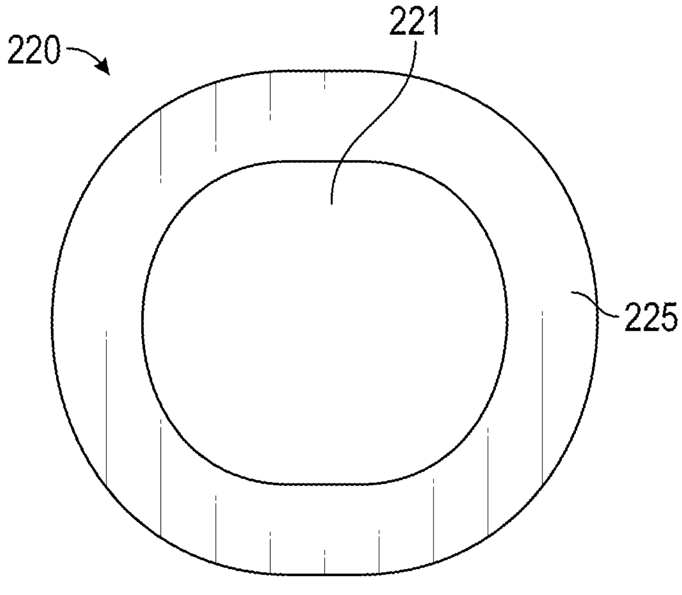
FIG. 9B is a top view of the inner bobbin of FIG. 9A.

FIG. 9A is an isometric view of an inner bobbin 220 in accordance with an example embodiment of the disclosed concept and FIG. 9B is a top view of the inner bobbin 220. In some example embodiments, the inner bobbin 220 may be composed of plastic material, which isolates windings from the core and eliminates the need to use jacketed wire. The inner bobbin 220 has a substantially oblong shape with a central hollow opening 221. The central hollow opening 221 has a diameter slightly larger than the diameter of the central core leg 212 of the upper core 210 such that the inner bobbin 220 can slide onto the central core leg 212.

The inner bobbin 220 includes flanges 225 located at each of its ends, however, it will be appreciated that the flanges 225 may be omitted in some example embodiments of the disclosed concept. The flanges 225 isolate the windings from the core. In some example embodiments, the inner bobbin 220 also includes ridges 222 formed in a central portion of the inner bobbin 220. The ridges 222 space the windings away from the central part of the central core leg 212. In some example embodiments, the central core leg 212 has an air gap and the ridges 222 may be used to space the winding away from the air gap so that eddy currents from fringing flux may be minimized. The ridges may extend around only a portion of the circumference of the inner bobbin 220, thus allowing a path for the wire of the winding to egress. It will be appreciated, though, that the ridges 222 may be omitted without departing from the scope of the disclosed concept. For example, in some example embodiments where the central core leg 212 does not have an air gap, the ridges 222 may be omitted.

The inner bobbin 220 may be similar to the inner bobbin 20 described above with respect to FIGS. 4A-D. However, the inner bobbin 220 includes an oblong shaped central hollow opening 221, rather than a cylindrical shaped central hollow opening 21. The oblong shaped central hollow opening 221 may correspond to the shape of the central core leg 212 of the upper core 210 such that the inner bobbin 220 can slide over the central core leg 212. It will be appreciated that the inner bobbin 220 may be modified to include features such as, without limitation, the notches 24, locking notches 23, or any other features of the inner bobbin 20 without departing from the scope of the disclosed concept. Similarly, it will be appreciated that the inner bobbin 20 may be modified to include features of the inner bobbin 220 without departing from the scope of the disclosed concept.

Figure 10A:
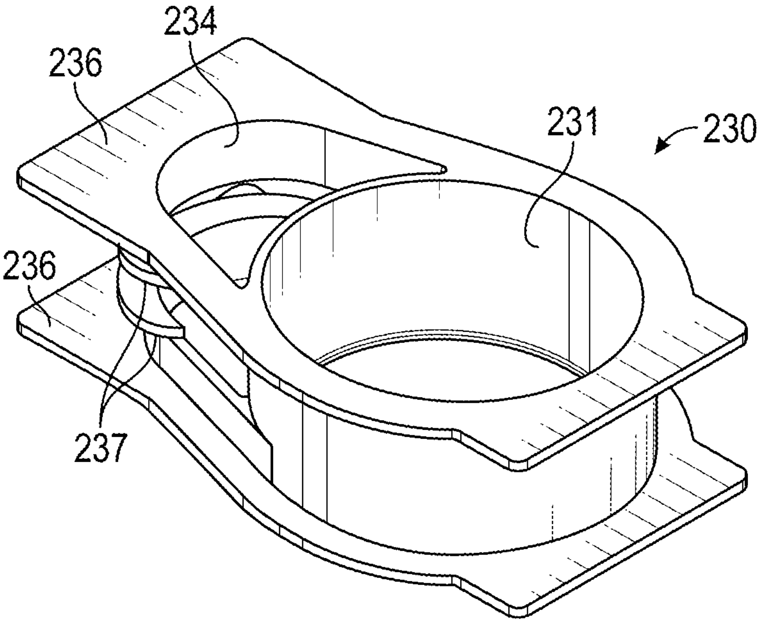
FIG. 10A is an isometric view of an outer bobbin in accordance with an example embodiment of the disclosed concept.
Figure 10B:
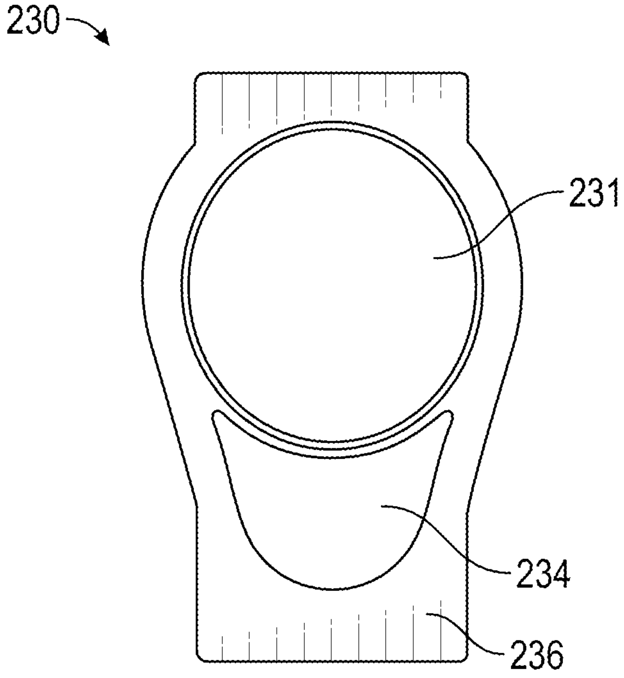
FIG. 10B is a top view of the output bobbin of FIG. 10A.

FIG. 10A is an isometric view of an outer bobbin 230 in accordance with an example embodiment of the disclosed concept and FIG. 10B is a top view of the outer bobbin 230. The outer bobbin 230, like the inner bobbin 220, may be composed of a plastic material that isolates its corresponding winding from the core as well as from the winding corresponding to the inner bobbin 220. The outer bobbin 230 has a three part shape including an upper portion, a lower portion, and a central portion. The outer bobbin 230 includes an oblong shaped central hollow opening 231 that is common to the upper, lower, and central portions of the outer bobbin 230. The diameter of the central hollow opening 231 is slightly larger than the diameter of the flanges 225 of the inner bobbin 220 such that the inner bobbin 220 can be nested within the outer bobbin 230. The outer bobbin 230 also includes flanges 236 formed at is ends which isolate the outer bobbin's 230 corresponding winding from the core and the winding corresponding to the inner bobbin 220. The outer bobbin 230 eliminates the need to use jacketed wire for voltage isolation.

The upper portion of the outer bobbin 230 has an oblong shape. The upper portion includes an oblong portion that corresponds to the shape of the outer core leg 213. The oblong portion extends away from the central hollow opening 231 of the outer bobbin 230. An outer hollow opening 234 is formed in the oblong portion. The outer hollow opening 234 has a shape that corresponds to the shape of the outer core leg 213. In some example embodiments, the outer core leg 213 and the outer hollow opening 234 both have half-moon shapes. The outer hollow opening 234 is slightly larger than the outer core leg 213 such that the outer hollow opening 234 can slide over the outer core leg 213. The oblong portion is bounded by flanges 236,237 on its upper and lower ends, which isolate the winding corresponding to the outer bobbin 230 from the core and space the winding away from the air gap in the outer core leg 213 so that eddy currents from fringing flux may be minimized. The height of the oblong portion is less than or equal to the height of the upper part of the outer core leg 213 such that the winding is restricted from extending over the air gap in the outer core leg 213.

The lower portion of the outer bobbin 230 is substantially similar to the upper portion of the outer bobbin 230. For example, the lower portion of the outer bobbin 30 includes an oblong portion and an outer hollow opening that are substantially similar in shape to the oblong portion and the outer hollow opening 234 in the upper portion of the outer bobbin 230.

The central portion of the outer bobbin 230, located between the upper and lower portions of the outer bobbin 230, does not include oblong portions. Rather, the central portion only includes the oblong shaped portion of the outer bobbin 230 including the oblong shaped central hollow opening 231.

The outer bobbin 230 may be similar to the outer bobbin 30 described above with respect to FIGS. 5A-D. However, the outer bobbin 230 includes an oblong shaped central hollow opening 231, rather than a cylindrical shaped central hollow opening 31. The oblong shaped central hollow opening 231 may correspond to the shape of the central core leg 212 of the upper core 210 such that the outer bobbin 230 can slide over the central core leg 212. It will be appreciated that the outer bobbin 230 may be modified to include features of the outer bobbin 30 without departing from the scope of the disclosed concept. Similarly, it will be appreciated that the outer bobbin 30 may be modified to include features of the outer bobbin 230 without departing from the scope of the disclosed concept.

The upper core 210 may be combined with the same or similar lower core to form a core similar to the core 10,11 formed from the upper and lower cores 10,11 described above with respect to FIGS. 1, 2A, and 2B. The inner bobbin 220 and the outer bobbin 230 may be employed with the upper core 210 and corresponding lower core, along with corresponding first and second windings, to form a combined transformer/inductor device, similar to how the core 10,11, inner bobbin 20, outer bobbin 30, first winding 40, and second winding 50 form the combined transformer/inductor device 100 described above with respect FIGS. 1, 2A, and 2B. For example, the windings may be made around the inner and outer bobbins 220,230, the inner bobbin 220 may be nested within the outer bobbin 230, the inner bobbin 220 may slide onto the central core leg 212, and the outer bobbin 230 may be slid onto the inner and outer core legs 212,213, similar to how the combined transformer/inductor device 100 of FIG. 1 is assembled.

It will be appreciated by those having ordinary skill in the art that the cylindrical and oblong shapes of the central core legs 12,212 are non-limiting examples of shapes that may be employed as the central core leg. It will be appreciated that other shapes may be employed without departing from the scope of the disclosed concept. It will also be appreciated that the corresponding shapes of the openings in the inner and outer bobbins may be modified to correspond to any shape central core leg without departing from the scope of the disclosed concept.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A method of assembling a combined transformer/inductor device, the method comprising:

winding a first winding around an inner bobbin;

winding a second winding around an outer bobbin having a central hollow opening, wherein winding the second winding around the outer bobbin comprises:

winding the second winding around a first portion of the outer bobbin, the first portion of the outer bobbin having an oblong shape and including a first outer hollow opening and a first portion of the central hollow opening, wherein winding the second winding around the first portion of the outer bobbin includes winding the second winding around the first portion of the central hollow opening and the first outer hollow opening; and winding the second winding around a central portion of the outer bobbin, the central portion of the outer bobbin including a second portion of the central hollow opening, wherein winding the second winding around the central portion the central portion of the outer bobbin includes winding the second winding around the second portion of the central hollow opening;

sliding the inner bobbin into the outer bobbin;

sliding the inner bobbin onto a central leg of an upper or lower portion of a core and sliding the outer bobbin onto the central leg and an outer leg of the upper or lower portion of the core; and joining the upper and lower portions of the core.

2. The method of claim 1, wherein winding the second winding around the outer bobbin further comprises:

winding the second winding around a second portion of the outer bobbin, the second portion of the outer bobbin having an oblong shape and including a second outer hollow opening and a third portion of the central hollow opening, wherein winding the second winding around the second portion of the outer bobbin includes winding the second winding around the third portion of the central hollow opening and the second outer hollow opening, wherein the central portion of the outer bobbin is disposed between the first and second portions of the outer bobbin.

3. The method of claim 2, wherein the first portion of the outer bobbin includes a first flange disposed along a first lower edge of the first portion and the second portion of the outer bobbin includes a second flange disposed along a first upper edge of the second portion.

4. The method of claim 3, wherein the first portion of the outer bobbin includes a third flange disposed along a second upper edge of the first portion and the second portion of the outer bobbing includes a fourth flange disposed along a second lower edge of the second portion, wherein winding the second winding around the first portion of the outer bobbin includes winding the second winding around the first portion of the outer bobbin between the first and third flanges and winding the second winding around the second portion of the outer bobbin includes winding the second winding around the second portion of the outer bobbin between the second and fourth flanges.

5. A method of assembling a combined transformer/inductor device, the method comprising:

winding a first winding around an inner bobbin;

winding a second winding around an outer bobbin having a central hollow opening, wherein winding the second winding around the outer bobbin comprises:

winding the second winding around a first portion of the outer bobbin, the first portion of the outer bobbin having an oblong shape and including a first outer hollow opening and a first portion of the central hollow opening, wherein winding the second winding around the first portion of the outer bobbin includes winding the second winding around the first portion of the central hollow opening and the first outer hollow opening; and winding the second winding around a central portion of the outer bobbin, the central portion of the outer bobbin including a second portion of the central hollow opening, wherein winding the second winding around the central portion the central portion of the outer bobbin includes winding the second winding around the second portion of the central hollow opening;

sliding the inner bobbin into the outer bobbin;

sliding the inner bobbin onto a central leg of an upper or lower portion of a core and sliding the outer bobbin onto the central leg and an outer leg of the upper or lower portion of the core; and joining the upper and lower portions of the core, wherein sliding the inner bobbin into the outer bobbin occurs before winding the second winding around the outer bobbin.

6. The method of claim 1, wherein the inner bobbin and the central portion of the outer bobbin have substantially cylindrical shapes.

7. The method of claim 1, wherein the outer bobbin includes at least one first locking feature and the inner bobbin includes at least one second locking feature, wherein the at least one first locking feature is structured to interact with the at least one second locking feature to prevent the inner bobbin and the outer bobbin from rotating with respect to each other, and wherein sliding the inner bobbin into the outer bobbin includes locking the inner bobbin and outer bobbing to prevent the inner bobbin and the outer bobbin from rotating with respect to each other using the first and second locking features.

8. The method of claim 1, wherein the inner bobbin includes at least one notch structured to allow egress, wherein the method further comprises:

egressing the first winding through the at least one notch.

9. A method of assembling a combined transformer/inductor device, the method comprising:

winding a first winding around an inner bobbin;

winding a second winding around an outer bobbin having a central hollow opening, wherein winding the second winding around the outer bobbin comprises:

winding the second winding around a first portion of the outer bobbin, the first portion of the outer bobbin having an oblong shape and including a first outer hollow opening and a first portion of the central hollow opening, wherein winding the second winding around the first portion of the outer bobbin includes winding the second winding around the first portion of the central hollow opening and the first outer hollow opening; and winding the second winding around a central portion of the outer bobbin, the central portion of the outer bobbin including a second portion of the central hollow opening, wherein winding the second winding around the central portion the central portion of the outer bobbin includes winding the second winding around the second portion of the central hollow opening;

sliding the inner bobbin into the outer bobbin;

sliding the inner bobbin onto a central leg of an upper or lower portion of a core and sliding the outer bobbin onto the central leg and an outer leg of the upper or lower portion of the core; and joining the upper and lower portions of the core, wherein the first winding forms a first winding of a transformer and the second winding forms a second winding of the transformer and a winding of an inductor.

10. The method of claim 1, wherein the outer bobbin includes one or more protrusions structured to abut against the inner bobbin to prevent the inner bobbin from moving vertically in one direction beyond a predetermined point within the outer bobbin.

11. The method of claim 1, wherein the central core leg has a substantially cylindrical shape, wherein the inner bobbin includes an opening having a substantially cylindrical shape and the central hollow opening of the second bobbing has a substantially cylindrical shape, and wherein sliding the inner bobbin onto the central leg and sliding the outer bobbin onto the central and outer core leg includes sliding opening of the inner bobbin and the central hollow opening of the outer bobbin onto the central core leg.

12. The method of claim 1, wherein the central leg of the core has a substantially oblong shape.

13. The method of claim 12, wherein the outer core leg includes a radiused outer surface, and wherein the first outer opening of the outer bobbin includes a radiused inner surface.

14. The method of claim 1, wherein sliding the outer bobbin onto the central and outer leg of the core includes sliding the first outer opening of the outer bobbin onto the outer leg of the core and sliding the central hollow opening of the outer bobbin onto the central leg of the core.

* * * * *